May 29, 1951 A. W. REITZ 2,554,923
PARKING METER BILLBOARD
Filed July 12, 1950
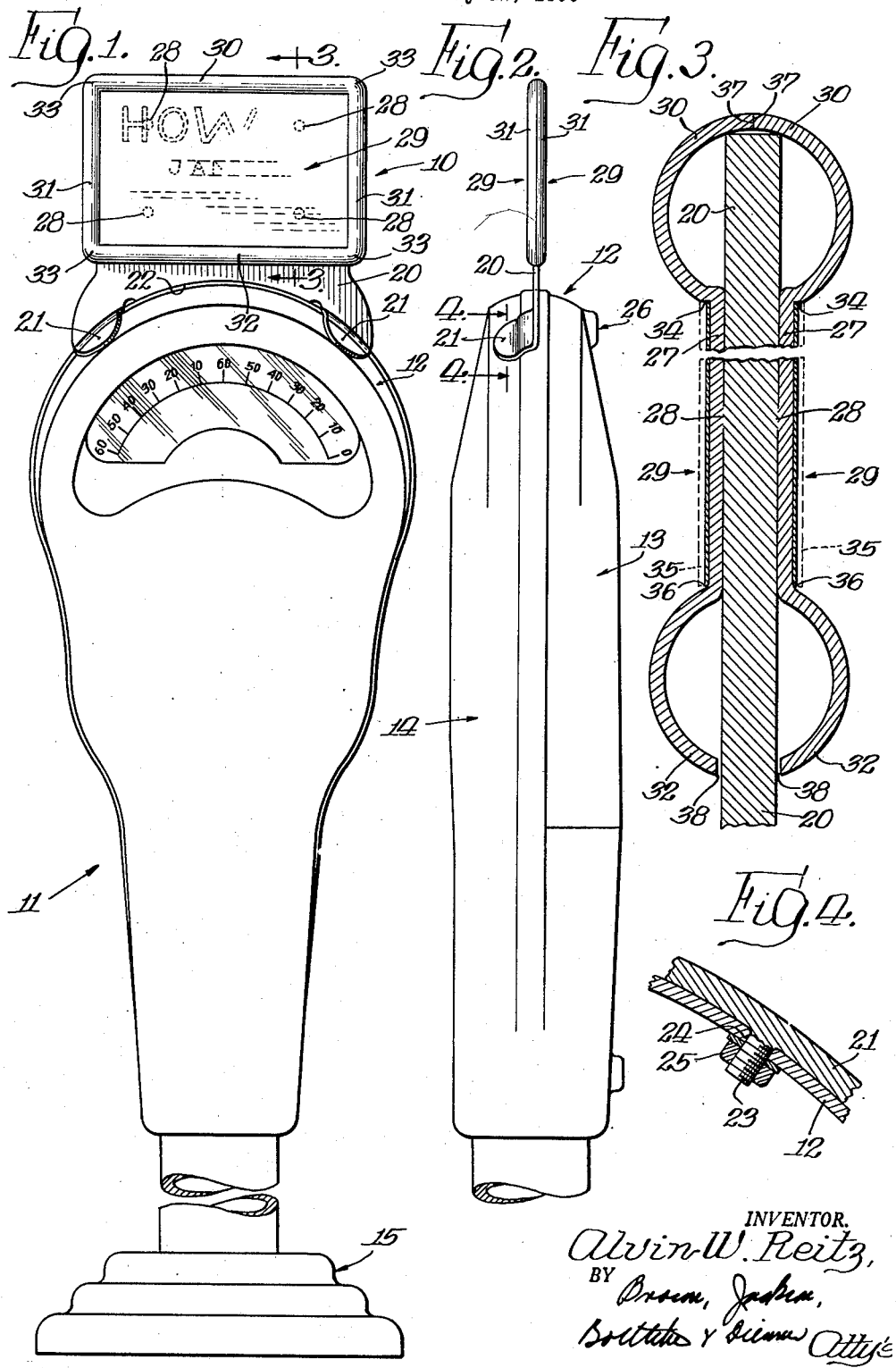
INVENTOR.
Alvin W. Reitz Patented May 29, 1951

2,554,923

UNITED STATES PATENT OFFICE 2,554,923

PARKING METER BILLBOARD

Alvin W. Reitz, Niles, Ill.

Application July 12, 1950, Serial No. 173,362

4 Claims. (Cl. 40—125)

My present invention is directed to a new and useful billboard or advertising attachment for use atop automobile parking meters presently familiar in most municipalities in the United States.

The medium of advertising by display notices or pictures on sign boards is most satisfactory; however, the use of large display boards in the restricted business areas of municipalities is always limited. Therefore, there exists a constant demand for more and more space in which advertisements of various assortments can be displayed to attract the eye of the potential buyer. In the past ten years or so many municipalities have installed coin type parking meters along the business thoroughfares to increase the revenue of the town, as well as regulate automobile parking. These meters are usually installed on the sidewalks adjacent the curb so that they are easily visible by passers-by, as well as by those who use the parking space directly in front of the meters.

The underlying conception of my present invention was based on the observation that these parking meters would afford an excellent opportunity for supplying a part of the much demanded advertising space if a sign board or the like could be attached thereto. I, therefore, set about to design such a miniature sign or billboard which conveniently could be mounted on top of the parking meter in such a manner that advertising space would be afforded from both the front and back side of the parking meter. A corollary advantage of using the parking meter to provide the advertising space in this manner is that additional revenue will be brought into the city treasury by the sale of such advertising space.

Briefly, my invention comprises a rigid rectangular sign board construction of a size suitable for supporting small advertisements or the like in an eye arresting manner atop a conventional automatic municipal parking meter. The sign board is adapted to receive advertisements of different or like character on its opposite faces and additionally is provided with a bordering bead construction for protecting the advertisements from the weather or from being removed by passers-by. In use, my billboard will be supplied with paste-on signs which may be added thereto in multiple layers, one over the other, much as is the conventional practice with large advertising road side sign boards.

One of the main objects of my invention is to teach a new and useful sign board construction especially adapted for supporting advertisement materials atop a parking meter or the like.

Another object of my invention is to disclose a new and useful miniature sign board construction which is rugged and resistant to abuse and adapted for permanent installation on top of an automatic parking meter while maintaining an eye appealing appearance.

An additional object of my invention is to disclose a sign or billboard construction which is characterized by having two separated and non-interfering sign displaying areas for adapting it to multiple advertisement purposes whereby distinct or like advertisements may be viewed by the public from either side thereof.

Still another object of my invention is to provide a billboard construction having two separated sign displaying areas, each of which area is adapted to support advertising signs or notices in multiple layers, one pasted over the other, while at the same time such signs are afforded ample protection against their removal or damage from the weather.

These and further objects and features of my invention readily will appear to those familiar with this art, from time to time, as the following detailed description proceeds and especially with reference to the accompanying drawings.

In the drawings:

Figure 1 is a front elevational view of my billboard assembled with a typical parking meter housing;

Figure 2 is an enlarged partial end elevational view of the assembly illustrated in Figure 1;

Figure 3 is a cross sectional view of my billboard showing the details of its construction, taken substantially on line 3—3 of Figure 1 and looking in the direction of the arrows; and Figure 4 is an enlarged cross sectional view taken substantially along line 4—4 of Figure 2, showing the detail of fastening my billboard to a parking meter housing.

With reference to Figures 1 and 2 of the drawings, it will be observed that the assembly therein illustrated shows my billboard 10 mounted in place on top of a conventional automatic coin type of parking meter indicated generally at 11. The parking meter housing, as shown herein, is characterized by a substantially semi-circular curved upper wall, indicated generally at 12, and having a hinged cover portion 13 adapted to swing arcuately away from a fixed wall portion 14 of the meter housing; the hinged cover and fixed wall constituting opposite faces of the parking meter. A pedestal 15 is normally provided for supporting the parking meter 11.

My billboard 10, which is adapted to be supported and mounted rigidly to the top curved wall 12 of the parking meter comprises generally, as shown herein, a unitary central supporting wall or plate 20 having a substantially rectangular configuration. Preferably the supporting plate 20 is made of stainless steel or like non-corrosive material, or if desired it may be of ordinary sheet steel and dipped in a suitable rust preventative or given a suitable anti-corrosive parkerized treatment or the like; the related parts of the billboard being of a like non-corrosive and rust-proof character as well.

The lower limits of the central supporting wall 20 are characterized by a pair of separated offset mounting feet 21 suitably formed and shaped to fit the curvilinear contour of the curved upper wall portion 12 of the meter; the feet being formed integrally with wall 20 by a stamping operation or the like. A lower edge 22 of wall 20 is suitably cut away with a curved shape between the feet members 21 to further adapt the mounting of the central wall 20 to the meter 11, by providing adequate clearance between wall 20 and wall 12 of the meter housing. Holding studs 23 are rigidly secured to and dependingly associated with the feet members 21, and are adapted to be inserted through suitable apertures 24, formed in the curved wall 12 associated with the fixed wall 14 of the meter's housing. The feet may be rigidly fastened and held to wall 12 by suitable nuts 25 threaded onto the stud members within the meter's housing, as shown in Figure 4. This latter feature is especially important in that it prevents tampering and removal of the billboard from the outside of the meter by passers-by, since the unfastening thereof can be accomplished only by opening the hinged cover 13 of the meter which is suitably locked with the fixed portion 14 of the housing by a lock, indicated generally at 26.

A pair of identical face plates, indicated generally at 27, are adapted to be mounted to the central wall 20 in back-to-back relation, one adjacent either side of the rectangular supporting portion thereof, and being rigidly secured thereto, as by spot welds, or like suitable means, indicated generally at 28. It will be noted that one such face plate is adapted to be mounted on each side of the central supporting wall to provide two recessed display areas 29, each comprising a substantially planar surface and adapted to be supported in parallel vertical planes on top of the parking meter. Preferably, the two face plates are of a lighter weight metal than the central wall member 20. Curvilinear bead edges are integrally formed with each of the face plates 27 along the outside borders thereof. Bead portion 30, 31, 31 and 32, indicating the respective top, side and bottom edges of each of the face plates, meet at the four corners 33 of the billboard in a suitable rounded manner to guard against the tearing of the clothing of passers-by. A straight planar shoulder portion 34 distinguishes the top and side bead members 30 and 31, 31 respectively, of each face plate 27; being located at the junction of the beads with the planar display area 29 of each face plate; the shoulder 34 lying in right angular relation to such display areas. The straight shoulder portion of bead 30 may be seen more clearly with reference to Figure 3, and is provided for the purpose of snugly covering over the adjacent edge of a mounted advertisement 35 for preventing the unauthorized removal of such signs by passers-by. It is intended that a special tool or scraper be provided for the eventual removal of such display advertisements by an authorized attendant. Additionally, such shoulder portions 34 adapt my billboard for protecting the advertisements displayed on the sign board areas from the rain or general weather. In this latter connection, it will be seen that rain or water will drip from the junction of the outer curved surface of the upper bead 30 with the shoulder portion 34 to clear the face of the display sign 35 instead of allowing water to seep behind the advertisement where the mastic or the like, which holds the "ad" to the sign board area 29, is located. The lower bead edge 32 of each face plate 27 has no such planar shoulder 34, but is characterized by a curvilinear or feathered radius 36 at its junction with the associated sign board area 29. This latter feature is additionally provided for allowing rain or the like readily to drip off of the advertisement instead of collecting at the lower edge thereof to cause its eventual loosening.

From an observation of Figures 2 and 3, it will be observed that each of the face plates 27 are mounted to the central supporting wall 20 by welding or the like, as mentioned above, so that abutting edges 37 of the bead portions meet along a common mating plane, with the curves of adjacent bead members forming a substantially cylindrical outer enclosing edge for my billboard. In order to facilitate the mating relationship of the abutting edges 37, a cutout portion 38 is formed in the lower bead 30 of each of the face plates whereby the central supporting wall 20 may be inserted snugly through the lower edges of beads 32 in final assembly.

By the use of the construction described above, it will be observed that the central supporting wall is adapted to give rigidity and ruggedness to my billboard by reinforcing the opposite face plates 27, and that the surrounding bead edges of the two face plates make for an eye appealing and safe construction with no sharp edges being presented to the passers-by. It further will be noted that in mounting my billboard to the stationary portion 14 of the meter housing, the offset formation of feet members 21 permit my billboard 10 to be supported in a vertical upright manner externally of the meter housing along a plane substantially midway between the opposite faces of the meter housing. It additionally will be observed that with this construction two separated display areas 29, 29 are provided which are adapted to mount rectangular advertisements or notices 35 thereon, as by gluing or the like. It is intended that changing of the notice or advertisement may be accomplished by merely adding the additional advertisement over the top of the underlying previously mounted "ad," with their eventual removal from the display areas 27 being accomplished by a suitable scraper or cutting tool.

It also should be recognized that, while I have herein shown my billboard mounted to a coin parking meter having a curvilinear upper profile, its concept applies equally well to meters of other shapes, such as rectangular. I have found that by building my billboard with a rectangular display area 29, having the approximate dimensions of 3 x 5 inches, the general esthetic appearance and size is satisfactorily in keeping with that of a parking meter, such as I have illustrated herein.

Thus, it may be seen that I have provided and described a new and useful miniature billboard having a rugged and protective construction adapted to be used on top of a parking meter whereby advertisement space effectively may be utilized for displaying advertisements to the potential buying public. Additionally, the provision of two separated sign board areas on my billboard allow for the mounting thereon of like or unlike advertisements which may be viewed one at a time, so as to avoid confusion to the observer.

While I have herein shown and displayed one form in which the features of my invention may appear, it readily will be understood that numerous changes, modifications and substitutions of equivalents may be made without departing from the spirit and scope thereof and, therefore, I do not wish to be limited to the specific embodiment herein illustrated, except as may appear in the following appended claims.

I claim:

1. A miniature parking meter billboard structure as described, comprising a central metal supporting plate having a substantially rectangular configuration, a pair of identical metal face plates adapted to be mounted one on either face of said central plate in coextensive relation therewith, said face plates providing a pair of oppositely facing display areas; a pair of spaced apart offset mounting feet dependingly formed from and comprising the lower reaches of said central plate to provide means for supporting said structure, and a substantially cylindrical bead structure bordering the top, bottom and side edges of said two face plates and adapted to overlap and conceal the top and side edges of said central plate.

2. A parking meter billboard of the class described, adapted to be mounted externally on top of a parking meter, comprising a pair of metal face plates, each consisting substantially of a planar recessed display area bordered by semi-cylindrical bead members raised along its top side and bottom edges, a central sheet metal plate adapted to be inserted between said two face plates to form a common mounting wall therebetween whereby said face plates are adapted to be fixed rigidly to said central plate and positioned in back-to-back relation, one on either side of said central plate, to provide two spaced oppositely facing display areas; and a pair of offset foot members formed integrally with said central plate and dependingly associated therewith, below said face plates, said feet conforming to the exterior upper contour of said meter for mounting said billboard thereto in a vertical position substantially midway between opposite faces of said meter.

3. A parking meter billboard of the class described adapted to be mounted to the upper exterior portion of a parking meter, comprising a pair of separated metal face plates adapted to be positioned in back-to-back parallel relation, a central rectangular supporting wall member insertable between said two separated face plates in substantially coextensive relation therewith, said central wall giving rigidity to the structure and providing a common support for said two face plates which are welded thereto; a hollow semi-cylindrical raised bead extending around the top, side and bottom edges of each of said face plates thereby defining the limits of a recessed display area on each of said face plates, said raised beads being formed integrally with said face plates and extending transversely of the plane of said two display areas sufficiently to overlap and enclose the top and side edges of said reinforcing central wall member, the bead edges of said two face plates meeting in a butt joint to form a substantially closed cylindrical bead comprising the top and side peripheries of said billboard with said raised bead members lying along the bottom edges of said two face plates being adapted to receive said central wall therethrough; and a pair of offset foot members formed integrally with said central wall member and reaching below the bottom edges of said two face plates, said feet being angularly disposed relative to said central wall whereby said billboard may be mounted to the upper external wall of said meter in a vertical manner so as to lie substantially midway between opposite faces of said meter.

4. The billboard structure as set forth in claim 3 wherein the beads along the top and side edges of said two face plates are distinguished by a straight shoulder portion at their junction with said display areas, said shoulders lying in transverse relation to said display areas whereby advertisements mounted over said areas have their top and side edges inaccessibly housed against said shoulders.

ALVIN W. REITZ.

No references cited.